Aug. 8, 1933.                R. S. CUNARD                1,921,349
                              SEMAPHORE
                       Filed Feb. 10, 1932      2 Sheets-Sheet 1
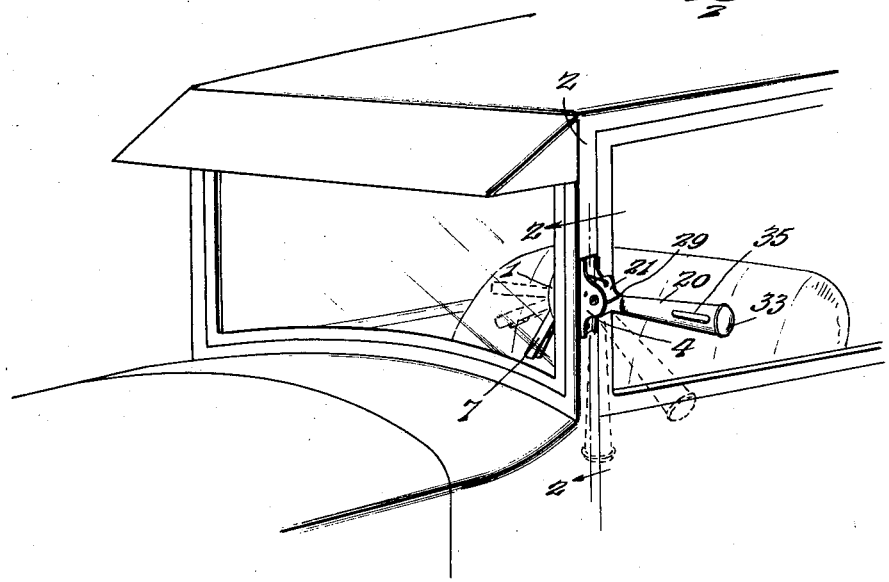
Inventor
R. S. Cunard.
By Lacey & Lacey,
Attorneys Aug. 8, 1933.   R. S. CUNARD   1,921,349
SEMAPHORE
Filed Feb. 10, 1932   2 Sheets-Sheet 2
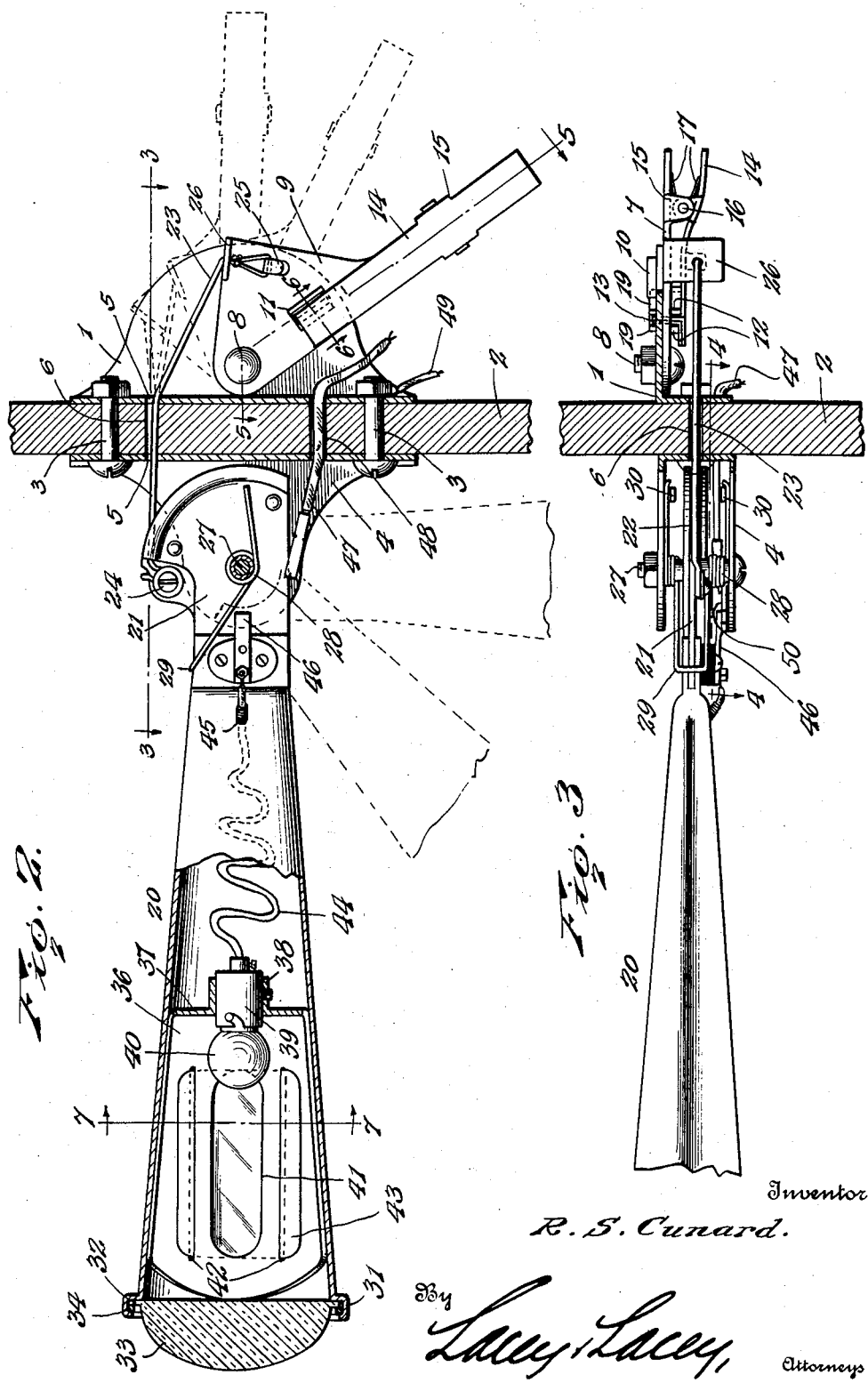

Patented Aug. 8, 1933

1,921,349

UNITED STATES PATENT OFFICE 1,921,349

SEMAPHORE

Russell S. Cunard, Everett, Pa.

Application February 10, 1932. Serial No. 592,157

2 Claims. (Cl. 116—54)

This invention is a semaphore for use upon motor vehicles to indicate to pedestrians and the occupants of other vehicles an intention to make a right or left turn. A particular object of the invention is to provide a novel holder for a lamp or bulb which may be easily removed when necessary to renew the lamp. Other objects of the invention will appear incidentally in the course of the following description, and the invention resides in certain novel features which will be particularly pointed out in the appended claims.

In the accompanying drawings,

Figure 1 is a perspective view of a portion of an automobile having my semaphore mounted thereon, Fig. 2 is a view, partly in elevation and partly in section, on the line 2—2 of Fig. 1, Fig. 3 is a view, partly in plan and partly in horizontal section, on the line 3—3 of Fig. 2.

Fig. 4 is a detail section on the line 4—4 of Fig. 3,

Fig. 5 is a section on the line 5—5 of Fig. 2,

Fig. 6 is a section on the line 6—6 of Fig. 2, and

Fig. 7 is a detail section on the line 7—7 of Fig. 2.

The automobile may be of any known or approved design and it is intended that the device of the present invention be mounted upon the body of the vehicle at a point where it may be conveniently manipulated by the chauffeur. In carrying out the invention, there is provided a base bracket 1 having a web to fit against the inner side of the front post 2 of the vehicle body immediately adjacent the windshield frame, and another web disposed at a right angle to the first-mentioned web to extend inwardly from the post 2. This base bracket is secured to the post by bolts 3 inserted through the post and through the upper and lower ends of the bracket, and these bolts also serve to secure a second bracket 4 against the outer side of the post. The brackets are each provided with an opening 5 through its basal web, and an opening 6 is formed through the post in alinement with the openings 5 for a purpose which will presently appear. Pivoted to the bracket 1 is an operating lever 7, and the edge of the supporting web of the bracket is formed on an arc concentric with the pivot or fulcrum 8 of the lever. The lever is formed with a lateral extension 9 and may be stamped from sheet metal, a tongue 10 being struck from the lever and bent into angular form so as to engage the edge of the supporting bracket, as shown most clearly in Fig. 5, whereby the lever will be held to the bracket as it is turned to set the signal arm in a desired position. The plate-like lateral extension 9 of the lever is formed with an opening 11 therethrough, and guiding lips 12 are struck from the lever at the sides of said opening whereby to guide a flange 13 formed at the end of a latch 14 which is pivoted upon the lever and is spring-pressed toward the lever, as shown in Figs. 3 and 5. The lever and the latch are provided with mating lugs or ears 15 on their opposed faces, and a pivot 16 is fitted through these lugs or ears to connect the latch to the lever, a spring 17 being coiled around the pivot and having its ends bearing against the opposed faces of the lever and the latch, respectively. The bracket 1 is provided with openings, one of which is shown at 18 in Fig. 6, and lips 19 are formed on the bracket at the sides of the openings whereby when the locking lip 13 of the latch is permitted to enter the opening 11 in the lever it will also enter the adjacent opening 18 in the bracket and thereby lock the lever and the signal arm in a set position. It will, of course, be understood that two or more openings are provided and they are so located that when the locking lip is engaged in one of said openings the signal arm will be displayed in a horizontal position to indicate a turn to the left, and when another of said openings is engaged, the signal arm will be displayed in an oblique downwardly extending position to indicate a turn to the right. Normally, the arm hangs vertically downward to indicate that the vehicle is to travel straight ahead. The several positions of the signal arm are indicated in Figs. 1 and 2 and will be readily understood.

The signal arm 20 is hollow and preferably of elliptical cross section, as shown in Fig. 7. It is formed of sheet metal so as to attain strength without excessive weight, and tapers inwardly, the inner extremity of the arm being secured to a rocker plate 21 which is pivotally mounted upon the bracket 4 at the outer side of the vehicle, as shown in Figs. 1 and 2. The rocker plate 21 has an arcuate inner edge and is constructed to provide a groove or space, indicated at 22, to receive a cable 23 which passes through the openings 5 and 6 and is secured at its ends respectively to the rocker plate 21 and the extension 9 of the setting lever. The ends of the cable may be formed into loops, one loop being clamped to the rocker plate 21 by a screw inserted therethrough, as indicated at 24, and the other loop being engaged around a bent tongue 25 struck from the plate 9, as shown in Fig. 2, the cable passing through a lug 26 on the edge of the plate 9 so that it will be always held in alinement with the tongue 25, as will be understood. The bracket 4, as clearly shown in Fig. 3, is U-shaped, and the rocker plate 21 is disposed between the sides or cheeks of the bracket, a pivot bolt 27 being inserted through the plate and through the cheeks, as clearly shown. A torsion spring 28 is coiled around the pivot 27 and has its intermediate portion formed into a loop 29 spanning and bearing upon the upper side of the signal arm, while its ends are disposed immediately adjacent the cheeks of the bracket 4 and are held in tongues 30 struck therefrom. It will now be readily understood that when the signal arm is in its normal pendent position, the force of the spring 29 is exerted thereon to hold it in said position, and when the setting lever is swung downwardly, a pull is exerted upon the cable 23 so as to swing the arm upwardly and thereby put the spring under increased tension. The latch 14 is, of course, moved pivotally before the setting lever 7 is swung about its fulcrum, and when the lever has reached the desired position, the latch is released and is at once caused to engage an opening in the bracket 1 under the influence of the spring 17 so that the lever and the arm will be locked in the set position. When the lever is released and moved upwardly, the spring 29 acts upon the signal arm to lower the same and return it to its normal position.

The outer end of the signal arm is formed into a rim 31 which receives a flange 32 on a lid 33 which is of proper outline to fit within the rim, as will be understood. A split ring 34 is engaged within the rim and over the flange so as to hold the lid in its position. This lid is indicated as consisting of a glass lens but it may be opaque and may be of any material, as preferred. Longitudinal slots 35 are formed in the sides of the signal arm, and within the outer end of the arm is fitted a basket or lamp holder 36 which corresponds in its cross sectional contour to the cross section of the arm so that it will fit snugly within the arm and will be held against turning. The outer end of this basket or lamp holder is open, while the inner end is closed by a web 37 having a collar 38 formed thereon in which may be secured a lamp socket, indicated at 39. The lamp bulb 40 is fitted in the socket 39 in the usual manner and may be an ordinary bulb of the proper capactiy. In the side of the basket 36 are formed slots 41 which are arranged to aline with the slots 35 in the sides of the arm, and at the upper and lower sides of each slot 41 is a slit or narrow slot 42. Celluloid strips 43 are disposed over the slots 41 and have their edges inserted through the slits 42, as will be understood upon reference to Figs. 2 and 7, so that they will be firmly held in position and will serve as lenses to permit passage of light from the lamp 40. These celluloid lens sheets may be given any desired color to comply with traffic regulations.

It will be noted that when the lamp holder or basket 36 is in place, there will be a considerable empty space or chamber within the signal arm between the lamp holder and the pivoted end of the arm, so that there will be ample accommodation for a covered cable or conductor 44 supplying current to one side of the lamp, and when renewal of the lamp is necessary, it will not be necessary to disconnect the conductor inasmuch as the surplus length of the same will permit it to be drawn out with the lamp and lamp holder to facilitate the renewal or repairs. One end of the cable is carried through the side of the signal arm, as shown at 45, and is anchored to a contact plate 46 which is secured to, but insulated from, the rocker plate 21. A flexible covered conductor 47 extends through an opening 48 provided therefor in the post 2 so as to be carried to the battery and this conductor is anchored to an arcuate terminal 50 which is secured upon and insulated from the bracket 4 and upon which the plate 46 makes sliding contact, as shown in Figs. 2 and 4. The opposite side of the lamp circuit is grounded to the semaphore arm which is also grounded to the bracket 4 and the lower securing bolt 3. A conductor 49 is fastened to the bolt 3 and may be grounded at any convenient point of the vehicle body or frame.

From the foregoing description, taken in connection with the accompanying drawings, it will be seen that I have provided a very simple, compact and easily manipulated signal by which a motorist may easily indicate to pedestrians and other motorists his intention to depart from a straight-ahead course, and the signal arm will be firmly held in the position in which it may be set.

Having thus described the invention, I claim:

1. In a signal of the class described, a pivoted hollow signal arm tapering from its outer end and provided with slots in its sides adjacent its outer free end, a lamp holder fitted within the outer end of the signal arm and frictionally held therein and provided with display slots in its sides registering with the first mentioned slots and longitudinally extending slits at opposite sides of said slots, and sheet lenses passing over the slots in the lamp holder and having their edge portions engaged in the slits.

2. In a signal of the class described, a pivoted hollow signal arm tapering from its outer end and non-circular in cross section and provided with slots in its sides adjacent its outer free end, a tapered lamp holder frictionally held in the outer end of the arm and of like cross section whereby it will be held from turning, the lamp holder being provided with slots alined with the slots in the arm and the inner end of the holder extending across the arm, sheet lenses on the lamp holder extending over the slots therein, a lamp mounted in the inner end of the holder, and a conductor extending from the lamp within the arm.

RUSSELL S. CUNARD. [L. S.]